(12) United States Patent
Umezawa et al.

(10) Patent No.: US 8,341,703 B2
(45) Date of Patent: Dec. 25, 2012

(54) AUTHENTICATION COORDINATION SYSTEM, TERMINAL APPARATUS, STORAGE MEDIUM, AUTHENTICATION COORDINATION METHOD, AND AUTHENTICATION COORDINATION PROGRAM

(75) Inventors: Katsuyuki Umezawa, Machida (JP); Akira Kanehira, Tokyo (JP); Katsuya Terada, Yokohama (JP); Yoshiaki Yamaguchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 582 days.

(21) Appl. No.: 12/540,343

(22) Filed: Aug. 12, 2009

(65) Prior Publication Data

US 2010/0071033 A1 Mar. 18, 2010

(30) Foreign Application Priority Data

Aug. 13, 2008 (JP) .................................. 2008-208446

(51) Int. Cl.
*G06F 7/04* (2006.01)
(52) U.S. Cl. .......................................... 726/3; 709/225
(58) Field of Classification Search .................. 726/3–6; 380/247–250; 713/155–159, 168–181; 455/411; 709/225
See application file for complete search history.

(56) References Cited

U.S. PATENT DOCUMENTS

| 2004/0117818 A1* | 6/2004 | Karaoguz et al. ............... 725/31 |
| 2005/0066163 A1* | 3/2005 | Ikenoya ........................ 713/156 |
| 2009/0292918 A1* | 11/2009 | Mori et al. ..................... 713/168 |
| 2010/0281520 A1* | 11/2010 | Deguchi .......................... 726/3 |

FOREIGN PATENT DOCUMENTS

| JP | 2002-118560 | 4/2002 |
| JP | 2004-240819 | 8/2004 |
| JP | 2008-059038 | 3/2008 |

* cited by examiner

*Primary Examiner* — Kim Vu
*Assistant Examiner* — Suman Debnath
(74) *Attorney, Agent, or Firm* — Foley & Lardner LLP (57) ABSTRACT

In remotely coupling one terminal apparatus to a server apparatus, if an authentication processing of a user of one terminal apparatus has been already completed, the user can switch one terminal apparatus to another without an additional authentication processing. Authenticated information indicating that the authentication of the user has already been successfully completed is transferred to another terminal apparatus by coordinating the authenticated information between more than one terminal apparatuses. Another terminal apparatus receives a service from the server apparatus using the authenticated information. Upon coordinating the authenticated information among more than one terminal apparatuses, another terminal apparatus to receive the authenticated information may be authenticated. A storage medium which conducts the authentication may be coupled to a terminal apparatus to be authenticated.

16 Claims, 7 Drawing Sheets

| Identification number | Cipher/Authentication Algorithm | Lifetime | Others |
|---|---|---|---|
| 3618968477 | AL1 | LT1 | |
| 3175970192 | AL2 | LT2 | |
| ... | ... | ... | ... |

701 702 703 704

AUTHENTICATION COORDINATION SYSTEM, TERMINAL APPARATUS, STORAGE MEDIUM, AUTHENTICATION COORDINATION METHOD, AND AUTHENTICATION COORDINATION PROGRAM

INCORPORATION BY REFERENCE

This application claims priority based on a Japanese Patent Application No. 2008-208446 filed on Aug. 13, 2008, the disclosure of which is incorporated herein by reference.

BACKGROUND

The present invention relates to a technique of simplifying an authentication processing between a terminal apparatus and a server apparatus.

In an authentication processing technique, there has been known a method in which an authentication processing is conducted between a communication terminal and a remote apparatus, and a plurality of remote apparatuses share information on the authentication (see, for example, Japanese Laid-Open Patent Application, Publication No. 2002-118560 (to be referred to as Reference 1 hereinafter)). There has also been known a method in which an authentication processing is conducted between a packet communication device, instead of the terminal apparatus of Reference 1, and a network authentication access control server (see, for example, Japanese Laid-Open Patent Application, Publication No. 2004-240819 (to be referred to as Reference 2 hereinafter)). Further, there has been known a method in which ID information (a cooperative ID) is coordinated among a plurality of applications in a single terminal apparatus (see, for example, Japanese Laid-Open Patent Application, Publication No. 2008-59038 (to be referred to as Reference 3 hereinafter)).

SUMMARY

Compact-sized terminal apparatuses such as a mobile phone terminal apparatus have recently been sophisticated and thus provided with various services. The mobile phone terminal apparatus has the advantage of its availability anywhere and the disadvantage of its small screen. On the other hand, a personal computer terminal apparatus which has a large screen is suitable in some cases for efficiently receiving a service, though the personal computer terminal apparatus is not always available anywhere. It is therefore convenient if a user uses a mobile phone terminal apparatus to receive a service of limited version while the user is out, and, when the user sits at a personal computer terminal apparatus, the user can continue using the service of full version. At present in this case, however, the user needs to conduct an authentication processing with a server apparatus from which the mobile phone terminal apparatus receives the service, and, when the user switches from the mobile phone terminal apparatus to the personal computer terminal apparatus, the user needs to conduct another authentication processing with the server apparatus for continuously receiving the same service, which is troublesome.

In Reference 1, a single communication terminal moving from one place to another can be coupled from one remote unit to another, by distributing authentication information of the communication terminal to a plurality of the remote units via a network. In Reference 2, a terminal is coupled to a network, and a packet communication device disposed upstream of the network conducts an authentication processing, in place of the terminal. In Reference 3, ID information (a cooperative ID) is coordinated in a plurality of applications in a single terminal apparatus. Thus, References 1 to 3 do not disclose a technique of switching from one terminal apparatus to another.

The disclosed system simplifies an authentication processing between a terminal apparatus and a server apparatus.

In remotely coupling one terminal apparatus to a server apparatus, if an authentication processing of a user of the one terminal apparatus has been already completed, the user can switch the one terminal apparatus to another, with which the user can receive a service from the server apparatus using authenticated information which is coordinated between more than one terminal apparatuses.

According to the teaching herein, an authentication processing between a terminal apparatus and a server apparatus becomes simple.

These and other benefits are described throughout the present specification. A further understanding of the nature and advantages of the invention may be realized by reference to the remaining portions of the specification and the attached drawings.

DETAILED DESCRIPTION OF THE EMBODIMENT

Configuration

An embodiment of the present invention is described below in detail. However, the present invention is not limited to this embodiment. Description below is made with reference to related drawings where necessary.

Figure 1:
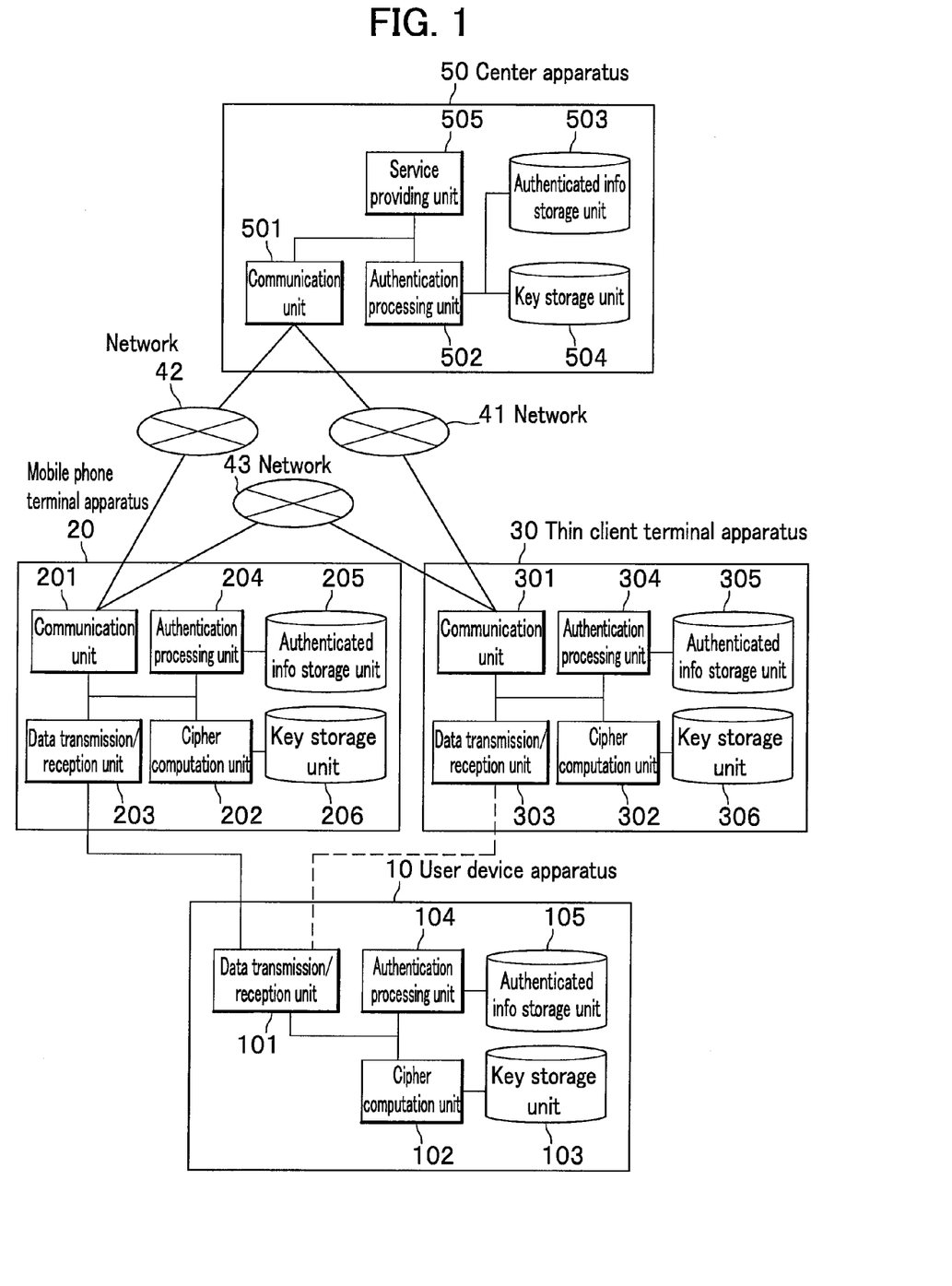
FIG. 1 is a diagram illustrating a functional configuration of an authentication coordination system according to an embodiment of the present invention.

FIG. 1 is a diagram illustrating a functional configuration of an authentication coordination system according to an embodiment of the present invention. As shown in FIG. 1, in the authentication coordination system, one or more thin client terminal apparatuses 30 and a center apparatus (which may also be referred to as a server apparatus) 50 are coupled to each other via one or more networks 41 such as the Internet and a telephone network. One or more mobile phone terminal apparatuses 20 and the center apparatus 50 are coupled to each other via one or more networks 42 such as the Internet and a mobile telephone network. The thin client terminal apparatus 30 and the mobile phone terminal apparatus 20 are coupled to each other via a network 43 such as a wireless LAN (Local Area Network), a proximity wireless communication, and a USB (Universal Serial Bus) coupling. Further, the mobile phone terminal apparatus 20 and one or more user device apparatuses 10 are coupled to each other via a contactless wireless communication, an IC (Integrated Circuit) card interface, a flash memory interface, or the like.

This embodiment assumes that the mobile phone terminal apparatus 20 is, for example, a mobile phone terminal apparatus owned by a user, and the thin client terminal apparatus 30 is, for example, a notebook PC (Personal Computer) equipped in an establishment for public use. The user uses the mobile phone terminal apparatus 20 while walking or taking a train and receives a service requiring an authentication and provided by the center apparatus 50. If the user enters the establishment and sits at a notebook PC for public use, which has a larger screen than the mobile phone terminal apparatus 20, the user in turn uses the notebook PC and continues using the service. The mobile phone terminal apparatus 20 is still coupled to the user device apparatus 10 as a storage medium of personal information with the user device apparatus 10 inserted therein. The user device apparatus 10 is embodied by, for example, an IC card, a flash memory, or the like as described above.

To use a service, the mobile phone terminal apparatus 20 makes an access request to the center apparatus 50 via the network 42. The center apparatus 50 then makes an authentication request to the mobile phone terminal apparatus 20. The mobile phone terminal apparatus 20 makes an authentication information generation request to the user device apparatus 10. The user device apparatus 10 performs a computation processing, using a prescribed algorithm for authentication; generates authentication information with which the user is proved to be a user that can use the service; and transmits the generated authentication information to the mobile phone terminal apparatus 20. The mobile phone terminal apparatus 20 transmits the received authentication information to the center apparatus 50. The center apparatus 50 performs an authentication processing for the user. If the user has been successfully authenticated, the mobile phone terminal apparatus 20 and the center apparatus 50 generate respective authenticated information indicating that the user has been successfully authenticated and store the respective authenticated information therein. Details of the authentication information and the authenticated information will be described hereinafter.

The mobile phone terminal apparatus 20 as an origin in switching from one terminal apparatus to another and the thin client terminal apparatus 30 as a destination in switching the terminal apparatuses mutually authenticate the user so as to realize the terminal apparatus switching. If the authentication has been successfully completed, the mobile phone terminal apparatus 20 transmits the already-generated authenticated information to the thin client terminal apparatus 30 via the network 43. The thin client terminal apparatus 30 couples itself to the center apparatus 50 via the network 41 using the authenticated information. Upon the coupling, the center apparatus 50 provides a prescribed service to the thin client terminal apparatus 30 without repeating the authentication request.

Next is described a functional configuration of each component of the authentication coordination system.

The user device apparatus 10 includes: a data transmission/reception unit 101 for transmitting and receiving a data to and from the mobile phone terminal apparatus 20; a key storage unit 103 for storing secret information which is kept secret from the outside, as a key, such as a password; a cipher computation unit 102 for performing a cipher processing required to generate authentication information using the secret information at the time of conducting an authentication; an authentication processing unit 104 for performing a processing of authenticating a terminal apparatus which has generated the authentication information; and an authentication information storage unit 105 for storing the authenticated information. The secret information is also stored in the center apparatus 50 in advance in order that the user uses a service from the center apparatus 50.

The mobile phone terminal apparatus 20 includes: a communication unit 201 for transmitting and receiving a data to and from the center apparatus 50 and the thin client terminal apparatus 30 via the networks 42, 43, respectively; a data transmission/reception unit 203 for transmitting and receiving a data to and from the user device apparatus 10; a key storage unit 206 for storing secret information which is kept secret from the outside, as a key, such as a password; a cipher computation unit 202 for performing a cipher processing required to generate authentication information using the secret information at the time of conducting an authentication; an authentication processing unit 204 for performing a processing of authenticating a terminal apparatus which has generated the authentication information; and an authenticated information storage unit 205 for storing an authenticated information.

The thin client terminal apparatus 30 includes: a communication unit 301 for transmitting and receiving a data to and from the center apparatus 50 and the mobile phone terminal apparatus 20 via the networks 41, 43, respectively; a data transmission/reception unit 303 for transmitting and receiving a data to and from the user device apparatus 10; a key storage unit 306 for storing secret information which is kept secret from the outside, as a key, such as a password; a cipher computation unit 302 for performing a cipher processing required to generate authentication information using the secret information at the time of conducting an authentication; an authentication processing unit 304 for performing a processing of authenticating a terminal apparatus which has generated the authentication information; and an authenticated information storage unit 305 for storing an authenticated information.

Note that, if the user uses a data stored in the user device apparatus 10, at the thin client terminal apparatus 30 as the destination of the terminal apparatus switching, the user couples the user device apparatus 10 to the thin client terminal apparatus 30. This allows the data to be used at the thin client terminal apparatus 30 via the data transmission/reception unit 101 and the data transmission/reception unit 303.

The center apparatus 50 includes: a communication unit 501 for transmitting and receiving data to and from the mobile phone terminal apparatus 20 and the thin client terminal apparatus 30 via the networks 42, 41, respectively; an authentication processing unit 502 for performing an authentication processing with the thin client terminal apparatus 30 and the thin client terminal apparatus 30; a key storage unit 504 for storing secret information which is used in the authentication processing; an authenticated information storage unit 503 for storing authenticated information generated as a result of performing the authentication processing; and a service providing unit 505 for providing a service.

The thin client terminal apparatus 30 and the mobile phone terminal apparatus 20 are interchangeable. That is, in FIG. 1, the thin client terminal apparatus 30 may be embodied by the mobile phone terminal apparatus 20. In turn, the mobile phone terminal apparatus 20 may be embodied by the thin client terminal apparatus 30.

Next is described a hardware configuration of each component of the authentication coordination system.

Figure 2:
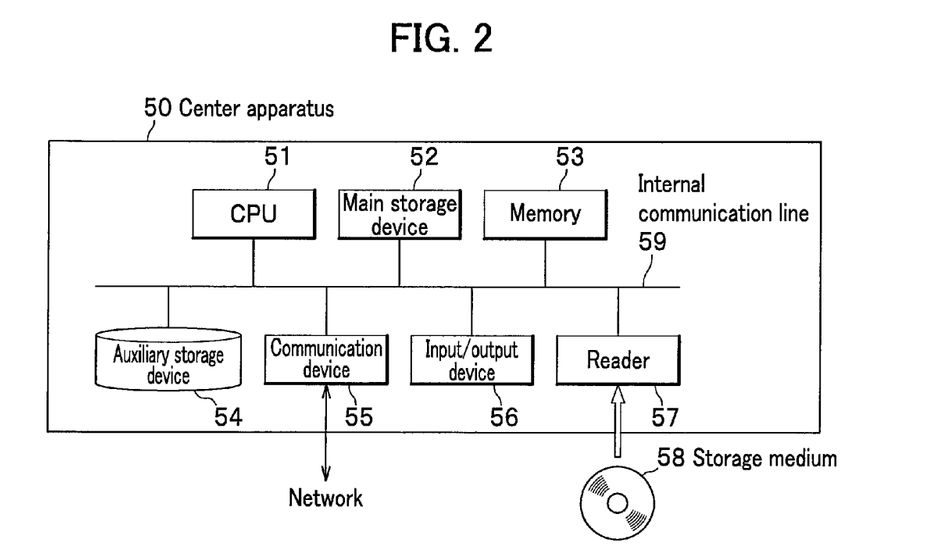
FIG. 2 is a diagram illustrating a hardware configuration of a center apparatus according to the embodiment.

FIG. 2 is a diagram illustrating the hardware configuration of the center apparatus 50. The center apparatus 50 is a computer having a configuration including: a CPU (Central Processing Unit) 51; a main storage device 52; a memory 53; an auxiliary storage device 54; a communication device 55; an input/output device 56; and a reader 57 for reading a storage medium 58, which are coupled to each other via an internal communication line 59 such as a bus.

Though not shown, the mobile phone terminal apparatus 20 is also a computer having a similar hardware configuration to the center apparatus 50, though there are some differences in size or performance therebetween. Note that, however, the input/output device 56 of the mobile phone terminal apparatus 20 has an interface coupled to the user device apparatus 10, through which a prescribed data is exchanged between the mobile phone terminal apparatus 20 and the user device apparatus 10.

Figure 3:
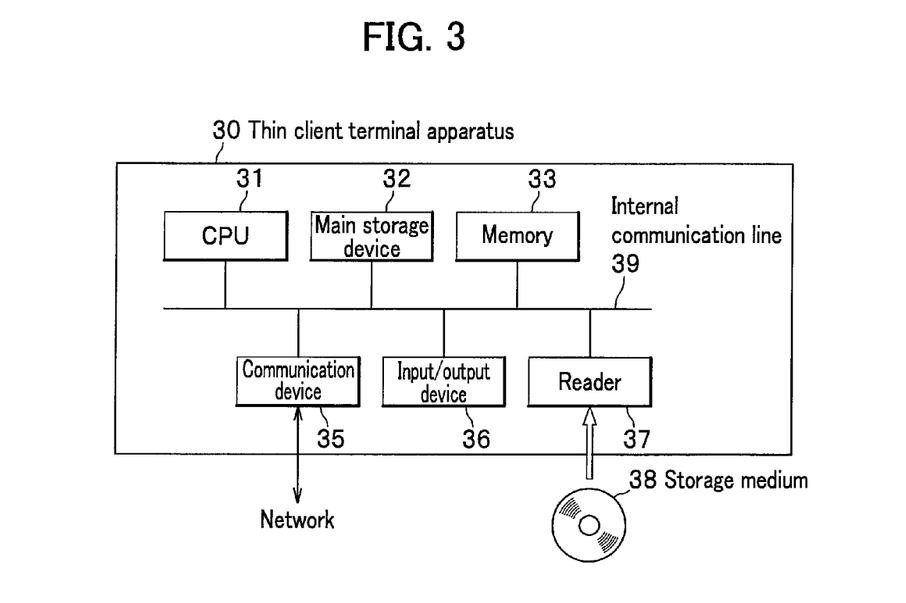
FIG. 3 is a diagram illustrating a hardware configuration of a thin client terminal apparatus according to the embodiment.

FIG. 3 is a diagram illustrating the hardware configuration of the thin client terminal apparatus 30. The thin client terminal apparatus 30 is a computer having a configuration including: a CPU 31; a main storage device 32; a memory 33; a communication device 35; an input/output device 36; and a reader 37 for reading a storage medium 38, which are coupled to each other via an internal communication line 39 such as a bus. Though not shown, the input/output device 36 has an interface coupled to the user device apparatus 10, through which a prescribed data is exchanged between the thin client terminal apparatus 30 and the user device apparatus 10.

Figure 4:
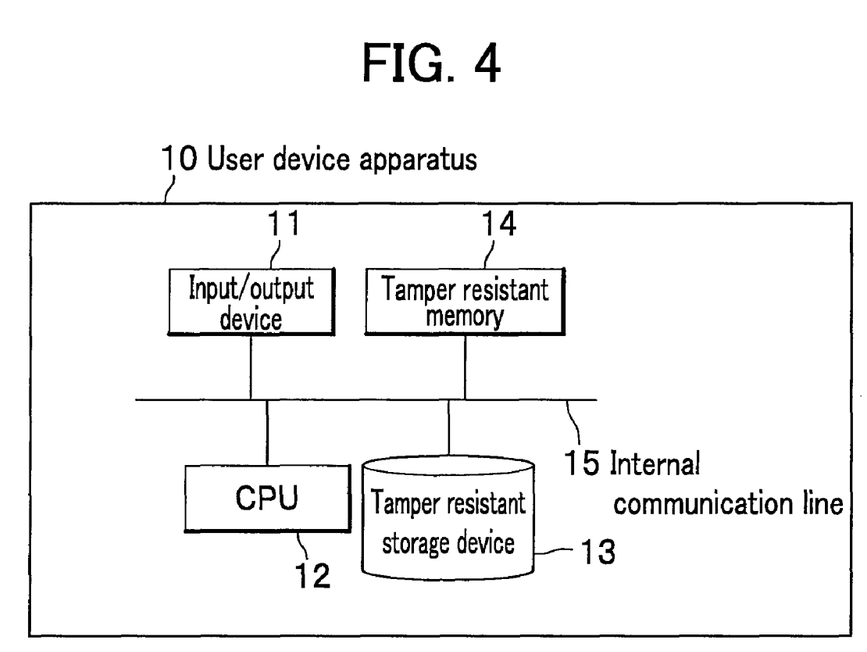
FIG. 4 is a diagram illustrating a hardware configuration of a user device apparatus according to the embodiment.

FIG. 4 is a diagram illustrating the hardware configuration of the user device apparatus 10. The user device apparatus 10 is a computer having a configuration including: a CPU 12; an input/output device 11; a tamper resistant memory 14; and a tamper resistant storage device 13, which are coupled to each other via an internal communication line 15 such as a bus.

<<Processing>>

Next is described an authentication processing according to this embodiment. A program stored in a storage device of each apparatus (including a main storage device, an auxiliary storage device, and a tamper resistant storage device, which correspond to a server apparatus storage unit, a (first or second) terminal apparatus storage unit, and a storage medium storage unit, respectively) is loaded into a memory (including a tamper resistant memory). The program is executed by each CPU (which may also be referred to as a control unit including a server apparatus control unit, a (first or second) terminal apparatus control unit, and a storage medium control unit). This embodies a processing of each processing unit of each apparatus. The program may be stored in a storage device in advance or may be loaded via another storage device or a communication medium (such as a network, a carrier wave for carrying the network, and a digital signal) where necessary.

Figure 5:
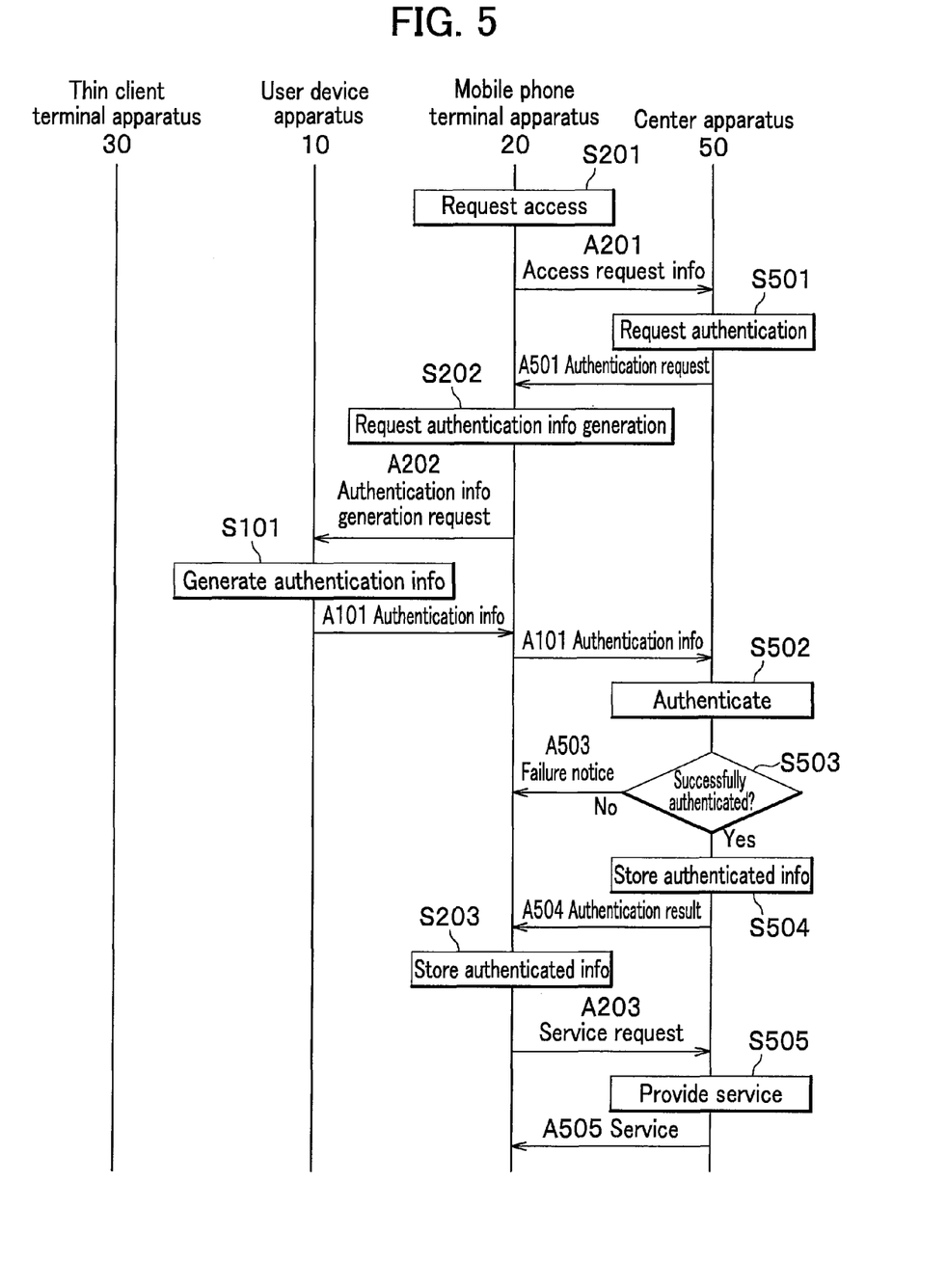
FIG. 5 is a processing flow diagram illustrating that an authentication processing is performed between a mobile phone terminal apparatus and the center apparatus according to the embodiment.

FIG. 5 is a processing flow diagram illustrating that the mobile phone terminal apparatus 20 performs an authentication processing together with the center apparatus 50, and the center apparatus 50 then provides a service to the mobile phone terminal apparatus 20.

The mobile phone terminal apparatus 20 makes an access request to the center apparatus 50 (S201) by transmitting access request information A201 thereto. The access request information A201 includes, for example, a login ID (Identification) used when a user using the mobile phone terminal apparatus 20 logs in for an access to the center apparatus 50 to receive a service.

Upon receiving the access request information A201, the center apparatus 50 makes an authentication request to the mobile phone terminal apparatus 20 (S501) by transmitting an authentication request A501 thereto. The authentication request includes, for example, a random number value (a challenge) used in a so-called challenge response. The authentication processing unit 502 of the center apparatus 50 is equipped with a randomizer for generating a random number value.

The mobile phone terminal apparatus 20 receives the authentication request A501 and requests the user device apparatus 10 to generate authentication information indicating that the user is authentic by transmitting an authentication information generation request A202 (S202). The authentication information generation request A202 also includes a random number value. Note that the mobile phone terminal apparatus 20 itself may generate the authentication information. However, it is assumed herein that the mobile phone terminal apparatus 20 makes the user device apparatus 10 which is tamper resistant generate the authentication information.

The cipher computation unit 102 of the user device apparatus 102 generates authentication information A101, using the authentication information generation request A202 and secret information stored in the key storage unit 103 (S101) and transmits the generated authentication information A101 to the mobile phone terminal apparatus 20. The secret information includes a value identical to a password stored in advance in the center apparatus 50. The password may be stored in advance in the user device apparatus 10 or may be inputted from the mobile phone terminal apparatus 20 together with a login ID when a user logs in to use a service. Or, the secret information may include a secret key of a public key cryptography. The authentication information A101 is, for example, a response in the challenge response (the response for the mobile phone terminal apparatus 20). The authentication information A101 is generated by performing a cipher processing using an algorithm for authentication which is shared by the user device apparatus 10 and the center apparatus 50. The mobile phone terminal apparatus 20 transfers the authentication information A101 to the center apparatus 50.

The authentication processing unit 502 of the center apparatus 50 performs an authentication processing using the authentication information A101 and information stored by itself in the key storage unit 504 (S502). The information stored in the key storage unit 504 includes a value identical to the password included in the secret information stored in the key storage unit 103. Or, if the public key cryptosystem is used, the information stored in the key storage unit 504 may include a public key corresponding to a secret key of the public key cryptosystem stored in the key storage unit 103. In the authentication processing, a response (for the center apparatus 50) is created by using the above-mentioned value and the random number value (challenge) created by the authentication request A501. If the response for the mobile phone terminal apparatus 20 matches the response for the center apparatus 50, this means that the authentication has been successfully completed. And, if not, the authentication has failed.

If the authentication has failed (if No in S503), the authentication processing unit 502 transmits a failure notice A503 indicating that the authentication has failed to the mobile phone terminal apparatus 20 and terminates the processing. After the termination of the processing, the user may restart the processing from S201 or may just stop using the mobile phone terminal apparatus 20. In any case, steps on and after S504 to be described later (including processings shown in FIG. 6A and FIG. 6B) will not be performed. On the other hand, if the authentication has been successfully completed (if Yes in S503), the authentication processing unit 502 generates authenticated information and stores the authenticated information in the authenticated information storage unit 503 (S504). The center apparatus 50 then transmits an authentication result A504 indicating that the authentication has been successfully completed to the mobile phone terminal apparatus 20.

In the mobile phone terminal apparatus 20, upon receiving the authentication result A504, the authentication processing unit 204 generates authenticated information and stores the authenticated information in the authenticated information storage unit 205. Note that the authenticated information generated in the mobile phone terminal apparatus 20 and the authenticated information generated in the center apparatus 50 are in one-to-one relationship. Alternatively, the mobile phone terminal apparatus 20 may obtain the authenticated information from the center apparatus 50.

The mobile phone terminal apparatus 20 then transmits a service request A203 requesting that the center apparatus 50 provides a service thereto, to the center apparatus 50. The center apparatus 50 then provides a service A505 to the mobile phone terminal apparatus 20 (S505).

Explanation of the processing flow shown in FIG. 5 is as described above.

Figure 6A:
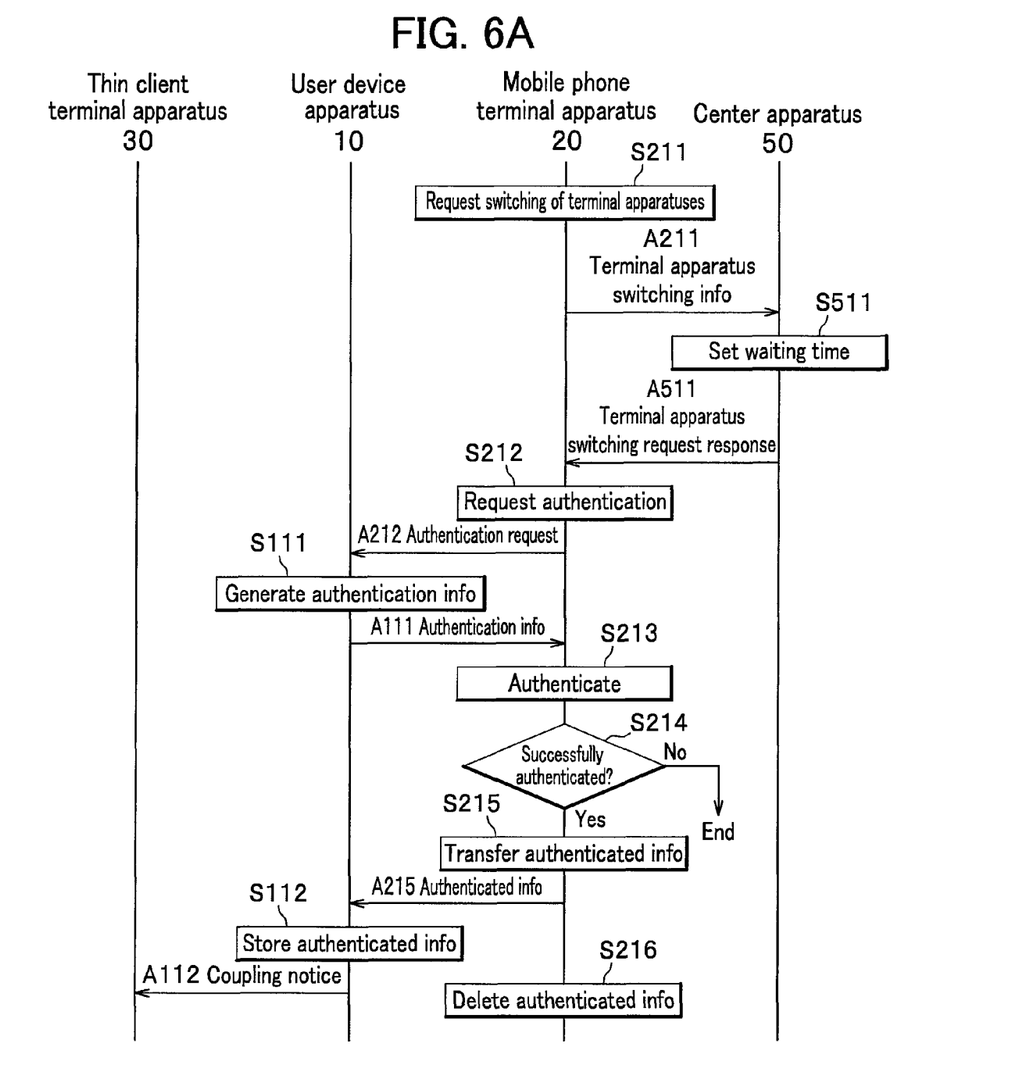
FIG. 6A in combination with FIG. 6B are processing flow diagrams illustrating that a terminal apparatus in use is switched from the mobile phone terminal apparatus to the thin client terminal apparatus according to the embodiment.
Figure 6B:
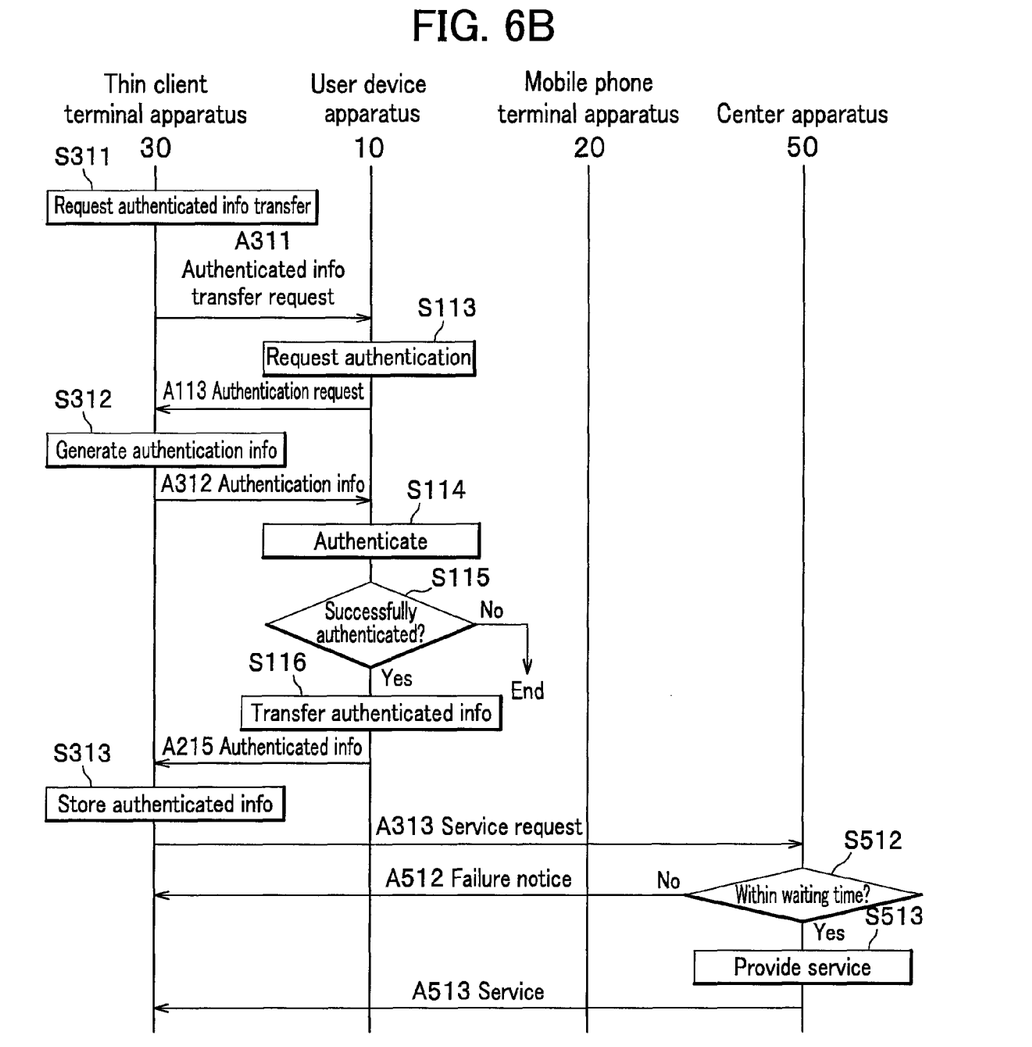

FIG. 6A in combination with FIG. 6B are processing flow diagrams illustrating that a terminal apparatus used by a user is switched from the mobile phone terminal apparatus 20 to the thin client terminal apparatus 30, and the thin client terminal apparatus 30 receives a service from the center apparatus 50.

A processing shown in FIG. 6A and FIG. 6B is performed after the processing of FIG. 5 is accomplished, and when the user of the mobile phone terminal apparatus 20 receives the service. Thus, steps performed in the processing of FIG. 5 are related to the processing of FIG. 6A and FIG. 6B. For example, the mobile phone terminal apparatus 20 stores therein the authenticated information (see S203 of FIG. 5), and the center apparatus 50 also stores therein the authenticated information (see S504 of FIG. 5). Further, when the processing of FIG. 6A and FIG. 6B is performed, the user does not conduct an operation required for a log out in order to stop using the service.

The mobile phone terminal apparatus 20 makes a terminal apparatus switching request indicating that a terminal apparatus for use is to be switched, to the center apparatus 50 by transmitting terminal apparatus switching information (A211) thereto (S211). The terminal apparatus switching information (A211) includes, for example, a value for identifying a terminal apparatus as an origin which is to be switched to another (that is, the mobile phone terminal apparatus 20).

Upon receiving the terminal apparatus switching request A211, the center apparatus 50 sets a waiting time (S511) and transmits a terminal apparatus switching request response A511 in response to the terminal apparatus switching request A211 to the mobile phone terminal apparatus 20. The waiting time herein is usually set at a time period estimated to be required from when the terminal apparatus switching request A211 is received until when the service request (A313) is received from a terminal apparatus as the switching destination (that is, the thin client terminal apparatus 30). The set waiting time is associated with an appropriate user and an appropriate service and is then stored in the storage unit of the center apparatus 50.

The mobile phone terminal apparatus 20 transmits an authentication request A212 to the user device apparatus 10 (S212). The authentication request A212 includes, for example, a random number value (a challenge) used in a challenge response. The authentication processing unit 204 of the mobile phone terminal apparatus 20 is equipped with a randomizer for generating a random number value. The authentication request A212 is information for requesting an authentication to be conducted so as to prove legitimacy of the user device apparatus 10, if the terminal apparatus used by the user is switched to the user device apparatus 10. The authentication makes it possible to prevent fraud such as impersonation using the user device apparatus 10.

The cipher computation unit 102 of the user device apparatus 10 generates authentication information (A111) using the authentication request A212 and the secret information stored in the key storage unit 103 (S111) and transmits the generated authentication information to the mobile phone terminal apparatus 20. The secret information includes a value identical to the password stored in advance in the mobile phone terminal apparatus 20. The password may be stored in advance in the user device apparatus 10 or may be inputted from the user device apparatus 10 when the terminal apparatus switching request (S211) is made. The authentication information A111 is, for example, a response in the challenge response (the response for the user device apparatus 10). The authentication information A111 is generated by performing a cipher processing using an algorithm for authentication which is shared by the user device apparatus 10 and the mobile phone terminal apparatus 20. The mobile phone terminal apparatus 20 transfers the authentication information A101 to the center apparatus 50. Or, if the public key cryptosystem is used, the authentication information A111 is generated by performing a cryptography processing using a secret key of the public key cryptosystem stored in the key storage unit 103.

The authentication processing unit 204 of the mobile phone terminal apparatus 20 performs the authentication processing using the authentication information A111 and the information stored in the key storage unit 206 (S213). The information stored in the key storage unit 206 includes a value identical to the password included in the secret information stored in the key storage unit 103. Or, if the public key cryptosystem is used, the information may be a public key corresponding to a secret key of the public key cryptosystem stored in the key storage unit 103. Specific procedures of the authentication processing are similar to the procedures conducted in the center apparatus 50 (see S502 of FIG. 5).

After the authentication processing, if the user device apparatus 10 is not proved to be authentic (If No in S214), the processing is terminated. Although the processing is terminated, the mobile phone terminal apparatus 20 continues to receive an ongoing service. On the other hand, if the user device apparatus 10 is proved to be authentic (if Yes in S214), the mobile phone terminal apparatus 20 performs an authenticated information transfer processing (S215) and transmits authenticated information A215 stored in the authenticated information storage unit 205 to the user device apparatus 10. The mobile phone terminal apparatus 20 then deletes the authenticated information A215 from the authenticated information storage unit 205 (S216). The deletion of the authenticated information from the mobile phone terminal apparatus 20 makes it possible that the center apparatus 50 rejects a command required for using a service from the mobile phone terminal apparatus 20.

The user device apparatus 10 stores the authenticated information A215 received from the mobile phone terminal apparatus 20 in the authenticated information storage unit 105 (S112). After that, for example, a user having the mobile phone terminal apparatus 20 to which the user device apparatus 10 is coupled comes close enough to the thin client terminal apparatus 30 to enable a noncontact wireless communication between the user device apparatus 10 and the thin client terminal apparatus 30. Then, the user device apparatus 10 transmits, to the thin client terminal apparatus 30, a coupling notice A112 indicating that the user device apparatus 10 is in communication coupling with the thin client terminal apparatus 30.

The thin client terminal apparatus 30 requests an authenticated information transfer to the user device apparatus 10 (S311) by transmitting an authenticated information transfer request A311 thereto. The authenticated information transfer request A311 includes, for example, a value for identifying a terminal apparatus as the destination apparatus (the thin client terminal apparatus 30).

The user device apparatus 10 transmits an authentication request A113 to the thin client terminal apparatus 30 (S113). The authentication request A113 includes, for example, a random number value (a challenge) used in a challenge response. The authentication processing unit 104 of the user device apparatus 10 is equipped with a randomizer for generating a random number value.

The authentication processing unit 304 of the thin client terminal apparatus 30 generates authentication information (A312) using the authentication request A113 and the secret information stored in the key storage unit 306 (S312) and transmits the generated authentication information to the user device apparatus 10. The secret information includes a value identical to the password stored in advance in the user device apparatus 10. The password may be stored in the thin client terminal apparatus 30 or may be inputted into the thin client terminal apparatus 30 when the authenticated information transfer is requested (S311). The authentication information (A312) is, for example, a response in the challenge response (the response for the thin client terminal apparatus 30). The authentication information (A312) is generated by performing a cipher processing using an algorithm for authentication which is shared by the thin client terminal apparatus 30 and the user device apparatus 10. Or, if the public key cryptosystem is used, the information is generated by performing a cryptography processing using a secret key of the public key cryptosystem stored in the key storage unit 103.

The authentication processing unit 104 of the user device apparatus 10 performs an authentication processing using the authentication information A312 and information stored by itself in the key storage unit 103 (S114). The information stored in the key storage unit 103 includes a value identical to the password included in the secret information stored in the key storage unit 306. Or, if the public key cryptosystem is used, the information may be a public key corresponding to a secret key of the public key cryptosystem stored in the key storage unit 103. Specific procedures of the authentication processing are similar to the procedures conducted in the center apparatus 50 (see S502 of FIG. 5).

After the authentication processing, if the thin client terminal apparatus 30 is not proved to be authentic (If No in S115), the processing is terminated. Although the processing is terminated, the mobile phone terminal apparatus 20 continues to receive an ongoing service. On the other hand, if the thin client terminal apparatus 30 is proved to be authentic (if Yes in S115), the user device apparatus 10 performs an authenticated information transfer processing (S116) and transmits the authenticated information A215 stored in the key storage unit 103 to the thin client terminal apparatus 30. Then, the authenticated information A215 stored in the user device apparatus 10 is usually deleted.

The thin client terminal apparatus 30 requests the center apparatus 50 to provide a service by transmitting a service request A313 thereto. Upon receipt of the service request A313, the center apparatus 50 determines whether or not the service request is received within the waiting time set in S511 (S512).

If it is not determined that the service request is received within the waiting time (if No in S512), a failure notice A512 indicating that the service can no longer be used because the waiting time has already elapsed is transmitted to the thin client terminal apparatus 30. On the other hand, If it is determined that the service request is received within the waiting time (if Yes in S512), the service A513 is provided to the thin client terminal apparatus 30 (S513).

The above-mentioned steps allow the user to continuously receive a service from the center apparatus 50 using the thin client terminal apparatus 30 without conducting any additional authentication processing.

Explanation of the processing flow shown in FIG. 6A and FIG. 6B is as described above.

Figure 7:
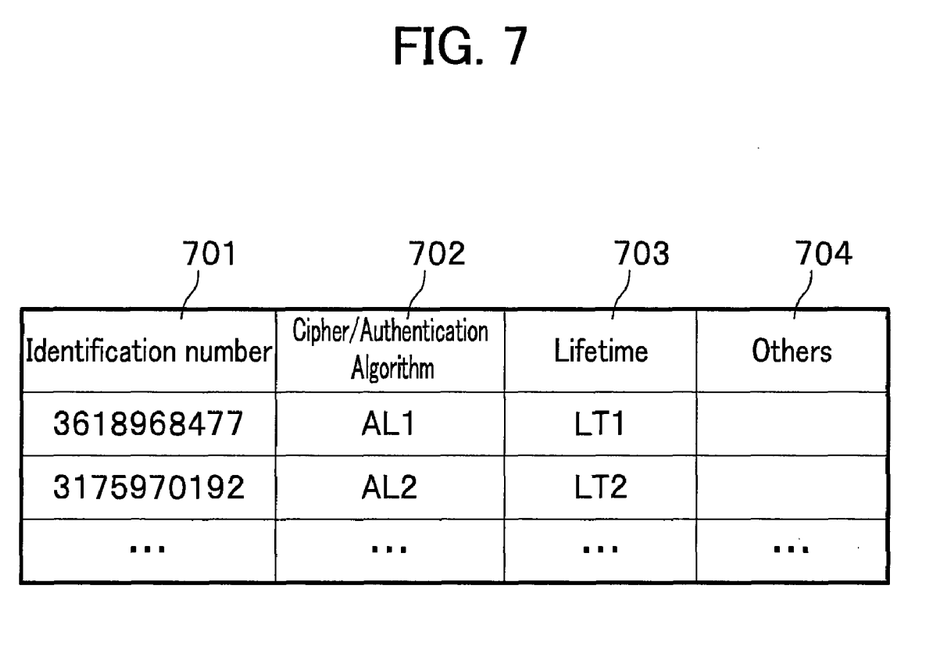
FIG. 7 is a diagram illustrating authenticated information according to the embodiment.

FIG. 7 shows an example of authenticated information registered in the authenticated information storage unit 503 of the center apparatus 50, the authenticated information storage unit 305 of the thin client terminal apparatus 30, the authenticated information storage unit 205 of the mobile phone terminal apparatus 20, and the authenticated information storage unit 105 of the user device apparatus 10. In the authenticated information, an identification number (701) identifies a user using a terminal apparatus (which may be one identification number for identifying the terminal apparatus itself). One identification number (701) is associated with: a cipher/authentication algorithm (702) for realizing encryption for use in generating authentication information; a lifetime (703) indicating a time of validity of the authentication information; and others (704) including a metadata such as a waiting time and a service to be provided. The center apparatus 50 uses the authentication information for notifying of an identification number each other with the thin client terminal apparatus 30 and the mobile phone terminal apparatus 20. This uniquely determines a cipher, an algorithm for authentication, and a lifetime to be used, thus allowing to establish a SA (Security Association) in a network such as a VPN (Virtual Private Network).

In this embodiment, a plurality of terminal apparatuses coordinate authenticated information. This can avoid the trouble of an additional authentication processing if one terminal apparatus is switched to another which is remotely coupled to a center apparatus.

The embodiment described above is the best mode for carrying out the present invention. However, the embodiment of the present invention is not limited to the above explanation, and those skilled in the art can make various modifications and variations to the present invention to adapt it to various usages and conditions without departing from the spirit and scope of the claims.

For example, this embodiment explains an example in which the mobile phone terminal apparatus 20 conducts an authentication of the center apparatus 50, receives a service, and transfers authenticated information to the thin client terminal apparatus 30, thus omitting an authentication processing between the thin client terminal apparatus 30 and the center apparatus 50. However, a contrary case is also possible. That is, the thin client terminal apparatus 30 may conduct an authentication of the center apparatus 50, receives a service, and transfers authenticated information to the mobile phone terminal apparatus 20, thus omitting an authentication processing between the mobile phone terminal apparatus 20 and the center apparatus 50. Further, a user may want to continuously use a service of the center apparatus 50, when, for example, the user first sits at a notebook PC (the thin client terminal apparatus 30) installed in an establishment and then goes out of the establishment to do something. In this case, it is convenient for the user to use the mobile phone terminal apparatus 20 outside the establishment.

The authenticated information may be transferred between a plurality of the mobile phone terminal apparatuses 20. Similarly, the authenticated information may be transferred between a plurality of the thin client terminal apparatuses 30. Such a transfer is effective especially when a terminal apparatus as a switching origin has broken down or a coupling between the terminal apparatus and the center apparatus 50 has some trouble.

In this embodiment, a step of authentication is conducted between the mobile phone terminal apparatus 20 as the switching origin and the thin client terminal apparatus 30 as the switching destination. To further simplify the authentication processing, the step may be skipped. Also, the authentication processing may be designed such that, once the thin client terminal apparatus 30 makes the authenticated information transfer request (see A311 of FIG. 6B), the authenticated information transfer is automatically executed without conducting an additional step.

In this embodiment, description is made using the thin client terminal apparatus 30 which does not have an auxiliary storage device. However, as the thin client terminal apparatus 30, a personal computer terminal apparatus having an auxiliary storage device may be used.

In this embodiment, in FIG. 6A and FIG. 6B, the authenticated information is transferred via the user device apparatus 10 between the mobile phone terminal apparatus 20 and the thin client terminal apparatus 30. However, the authenticated information may be directly transferred therebetween. More specifically, in FIG. 6A and FIG. 6B, the mobile phone terminal apparatus 20 first transmits the coupling notice A112 to the thin client terminal apparatus 30. The thin client terminal apparatus 30 transmits the authenticated information transfer request A311 to the mobile phone terminal apparatus 20. The mobile phone terminal apparatus 20 transmits an authentication request (which corresponds to A113) to the thin client terminal apparatus 30 (S212). S113 to S116 are herein performed not by the user device apparatus 10 but by the mobile phone terminal apparatus 20. S212, S111, S213, and the like performed between the mobile phone terminal apparatus 20 and the user device apparatus 10 are omitted herefrom.

In the embodiment, the authenticated information stored in each apparatus is generated by itself after checking authentication. However, another configuration may be used in which only the center apparatus 50 is authorized to generate authenticated information and transfer the generated authenticated information to other apparatuses. Such a limitation of the apparatus authorized to generate authenticated information can prevent various types of fraud.

In this embodiment, in FIG. 6A, the mobile phone terminal apparatus 20 transmits the terminal apparatus switching information A211 to the center apparatus 50. The center apparatus 50 sets the waiting time (S511). However, if the waiting time has already been set in advance, S211 performed by the mobile phone terminal apparatus 20 and S511 and S512 performed by the center apparatus 50 may be omitted. The waiting time may be arbitrarily set by a terminal apparatus as the switching origin (the mobile phone terminal apparatus 20).

Or, the waiting time may be arbitrarily set by the center apparatus 50 according to a service to be used. For security reason, a terminal apparatus may be designed to automatically log out after a given period of time has elapsed without any input of a command from the terminal apparatus. In that case, the waiting time is necessarily longer than the given period of time.

In this embodiment, the mobile phone terminal apparatus 20 as the switching origin transmits the authenticated information to the user device apparatus 10 and then deletes the authenticated information stored therein (S216 of FIG. 6A). Herein, there is some flexibility in timing for deleting the authenticated information. For example, the deletion may be carried out immediately after the authenticated information is transferred. This avoids accepting a command concerning a use of a service from the mobile phone terminal apparatus 20 as the switching origin. Further, the deletion may be suspended until a service to the thin client terminal apparatus 30 as the switching destination has actually started, if there is something wrong with the steps conducted after the transfer of the authenticated information, and operations from the thin client terminal apparatus 30 do not work. This ensures that the service can be used at least from the mobile phone terminal apparatus 20 as the switching origin. Similarly, the deletion may also be suspended if an authentication by the user device apparatus 10 has failed (if No in S115 of FIG. 6B) or the waiting time set in the center apparatus 50 has elapsed (if No in S512 of FIG. 6B).

In this embodiment, the user device apparatus 10 authenticates the thin client terminal apparatus 30 as the switching destination terminal apparatus (S114). In this case, if the authentication has failed, and the user device apparatus 10 again attempts to authenticate the thin client terminal apparatus 30, controls may be provided such that the waiting time set in the center apparatus 50 is prolonged.

A service provided by the center apparatus 50 may have a PC site version and a mobile phone site version (and the like), though contents of those versions are substantially the same. Controls may be provided by, for example, the center apparatus 50 such that the mobile phone site version is switched to the PC site version, when a user switches from the mobile phone terminal apparatus 20 to the thin client terminal apparatus 30. The switching of different site versions can be achieved by, for example, performing such a processing that an address specifying a site for a mobile phone is switched to an address corresponding thereto of a site for a PC. Similar controls are provided if the service provided to the thin client terminal apparatus 30 is switched to the mobile phone terminal apparatus 20.

In this embodiment, the terminal apparatuses 10, 30 are switched in a state where the user device apparatus 10 is in coupling with the mobile phone terminal apparatus 20. However, even if a change is made such that the user device apparatus 10 is coupled to the thin client terminal apparatus 30, the switching of the terminal apparatuses 10, 30 can be carried out regardless of timing of the change.

The user device apparatus 10 is usually coupled to the mobile phone terminal apparatus 20 as the switching origin until the user device apparatus 10 stores therein the authenticated information (see S112 of FIG. 6A), and then, the user device apparatus 10 is coupled to the thin client terminal apparatus 30 as the switching destination and conducts the authenticated information transfer request (see S311 of FIG. 6B). The timing of the switching is, however, not limited to this.

An authentication performed in this embodiment is a user authentication. However, the present invention is not limited to this. For example, a configuration is applicable in which an authentication between a terminal apparatus and a server apparatus is performed as a user authentication, and an authentication performed between terminal apparatuses (including a storage medium) is performed as a user authentication or a device authentication.

Specific configurations of hardware, software, flowcharts, and data structures can be changed without departing from the spirit and scope of the present invention.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An authentication coordination system, comprising: a server apparatus for providing a service to a plurality of terminal apparatuses;
   a first terminal apparatus using a service provided by the server apparatus; and a
   second terminal apparatus using a service provided by the server apparatus,
   wherein the server apparatus, the first terminal apparatus, and the second terminal apparatus are communicably coupled to each other,
   wherein the server apparatus comprises:
   a server apparatus control unit for requesting an authentication of a user of the first terminal apparatus to the first terminal apparatus, when the first terminal apparatus requests a use of a service, conducting the authentication of the user based on authentication information received from the first terminal apparatus for proving the user to be authentic, and generating authenticated information indicating that the authentication of the user has been successfully completed; and a server apparatus storage unit for storing therein the authenticated information,
   wherein the first terminal apparatus comprises:
   a first terminal apparatus control unit for generating authenticated information indicating that the authentication of the user has been successfully completed or obtaining the authenticated information from the server apparatus, and transmitting the authenticated information to the second terminal apparatus when the second terminal apparatus requests a transfer of the authenticated information; and
   a first terminal apparatus storage unit for storing therein the authenticated information, and
   wherein the second terminal apparatus comprises:
   a second terminal apparatus control unit for requesting the transfer of the authenticated information, to the first terminal apparatus, and requesting a use of the service to the server apparatus using the authenticated information received from the first terminal apparatus; and
   a second terminal apparatus storage unit for storing therein the authenticated information
   wherein the first terminal apparatus deletes the authenticated information after having transferred the authenticated information to the second terminal apparatus, and
   wherein the second terminal apparatus does not perform an authentication processing with the server apparatus after having been transferred the authenticated information by the first terminal apparatus.

2. The authentication coordination system according to claim 1,
   wherein the first terminal apparatus control unit of the first terminal apparatus:
   requests an authentication of the second terminal apparatus or a user thereof to the second terminal apparatus, if the second terminal apparatus requests a transfer of the authenticated information; conducts the authentication of the second terminal apparatus or the user thereof, based on authentication information received from the second terminal apparatus for proving the second terminal apparatus or the user thereof to be authentic; and, if the authentication of the second terminal apparatus or the user thereof has been successfully completed, transmits the authenticated information to the second terminal apparatus.

3. The authentication coordination system according to claim 2,
   wherein the first terminal apparatus and the second terminal apparatus are communicably coupled to a tamper resistant storage medium, and
   wherein the storage medium comprises:
   a storage medium control unit
   which, if the storage medium is coupled to the first terminal apparatus, generates authentication information for proving the storage medium or a user thereof to be authentic using secret information which is kept secret from the outside, if the first terminal apparatus requests an authentication of the storage medium or the user thereof, transmits the authentication information to the first terminal apparatus, and receives, if the authentication of the storage medium or the user thereof has been successfully completed at the first terminal apparatus, the authenticated information from the first terminal apparatus, and
   which, if the storage medium is coupled to the second terminal apparatus, requests an authentication of the second terminal apparatus or the user thereof if the second terminal apparatus requests a transfer of the authenticated information, conducts the authentication of the second terminal apparatus or the user thereof, based on authentication information received from the second terminal apparatus for proving the second terminal apparatus or the user thereof to be authentic, and transmits, if the authentication of the storage medium or the user thereof has been successfully completed, the authenticated information to the second terminal apparatus; and
   a storage medium storage unit for storing therein the secret information and the authenticated information.

4. The authentication coordination system according to claim 1,
   wherein the server apparatus control unit of the server apparatus: sets, if the first terminal apparatus requests a switch of terminal apparatuses for using the service, a waiting time which is a time period estimated to be required from when the terminal apparatus switching request is received until when a request of using the service is received from the second terminal apparatus as a destination of the switching; and provides the service to the second terminal apparatus, if the request of using the service is received before the waiting time has elapsed.

5. The authentication coordination system according to claim 1,
   wherein the first terminal apparatus is a mobile phone terminal apparatus or a thin client terminal apparatus, and wherein the second terminal apparatus is a mobile phone terminal apparatus or a thin client terminal apparatus.

6. The authentication coordination system according to claim 5,
wherein the first terminal apparatus is a mobile phone terminal apparatus, and
wherein the second terminal apparatus is a thin client terminal apparatus.

7. The authentication coordination system according to claim 5,
wherein the first terminal apparatus is a thin client terminal apparatus, and
wherein the second terminal apparatus is a mobile phone terminal apparatus.

8. A terminal apparatus for using a service provided by a server apparatus, comprising;
a terminal apparatus control unit
which, when the terminal apparatus is used as a switching origin when one terminal apparatus for using the service as a switching origin is switched to another as a switching destination, transmits authentication information for proving a user of the switching origin terminal apparatus to the server apparatus, conducts an authentication of the user at the server apparatus, generates or obtains from the server apparatus, authenticated information indicating a success of the authentication of the user, when the authentication has been successfully completed, and transmits the authenticated information to a terminal apparatus as the switching destination, when the switching destination terminal apparatus requests a transfer of the authenticated information, and
which, when the terminal apparatus is used as the switching destination when one terminal apparatus for using the service as the switching origin is switched to another as the switching destination, requests a transfer of the authenticated information to the switching origin terminal apparatus, and requests a use of the service to the server apparatus, using the authenticated information received from the switching origin terminal apparatus; and
a terminal apparatus storage unit for storing therein the authenticated information,
wherein the terminal apparatus deletes the authenticated information after having transferred the authenticated information to another terminal apparatus as the switching destination, and
wherein the another terminal apparatus as the switching destination does not perform an authentication processing with the server apparatus after having been transferred the authenticated information.

9. The terminal apparatus according to claim 8,
wherein, if the terminal apparatus is used as the switching origin, the terminal apparatus control unit: requests an authentication of the switching destination terminal apparatus or a user thereof, if the switching destination terminal apparatus requests a transfer of authenticated information; conducts the authentication of the switching destination terminal apparatus or the user thereof, based on authentication information received from the switching destination terminal apparatus for proving the switching destination terminal apparatus or the user thereof to be authentic; and transmits the authenticated information to the switching destination terminal apparatus, if the authentication of the switching destination terminal apparatus or the user thereof has been successfully completed.

10. A tamper resistant storage medium communicably coupled to the terminal apparatus according to claim 9,
wherein the storage medium comprises:
a storage medium control unit
which, if the storage medium is coupled to the switching origin terminal apparatus, generates authentication information for proving the storage medium or the user thereof to be authentic using secret information which is kept secret from the outside, if the switching origin terminal apparatus requests an authentication of the storage medium or the user thereof, transmits the authentication information to the switching origin terminal apparatus, and receives, if the authentication of the storage medium or the user thereof has been successfully completed at the switching origin terminal apparatus, the authenticated information from the switching origin terminal apparatus, and
which, if the storage medium is coupled to the switching destination terminal apparatus, requests an authentication of the switching destination terminal apparatus or the user thereof if the switching destination terminal apparatus requests a transfer of the authenticated information, conducts the authentication of the switching destination terminal apparatus or the user thereof, based on authentication information received from the switching destination terminal apparatus for proving the switching destination terminal apparatus or the user thereof to be authentic, and transmits, if the authentication of the switching destination terminal apparatus or the user thereof has been successfully completed, the authenticated information to the switching destination terminal apparatus; and
a storage medium storage unit for storing therein the secret information and the authenticated information.

11. An authentication coordination method in an authentication coordination system comprising a server apparatus for providing a service to a plurality of terminal apparatuses, a first terminal apparatus using a service provided by the server apparatus, and a second terminal apparatus using a service provided by the server apparatus, the server apparatus, the first terminal apparatus, and the second terminal apparatus being communicably coupled to each other,
wherein the server apparatus control unit of the server apparatus performs the steps of:
requesting an authentication of a user of the first terminal apparatus to the first terminal apparatus, when the first terminal apparatus requests a use of a service; and
conducting the authentication of the user based on authentication information received from the first terminal apparatus for proving the user to be authentic, and generating authenticated information indicating that the authentication of the user has been successfully completed,
wherein the first terminal apparatus control unit of the first terminal apparatus performs the steps of:
generating or obtaining from the server apparatus, authenticated information indicating that the authentication of the user has been successfully completed; and
transmitting the authenticated information to the second terminal apparatus when the second terminal apparatus requests a transfer of the authenticated information, and
wherein the second terminal apparatus control unit of the second terminal apparatus performs the steps of:
requesting the transfer of the authenticated information to the first terminal apparatus; and requesting the use of the service to the server apparatus using the authenticated information received from the first terminal apparatus, wherein the first terminal apparatus deletes the authenticated inebriation after having transferred the authenticated information to the second terminal apparatus and wherein the second terminal apparatus does not perform an authentication processing with the server apparatus after having been transferred the authenticated information by the first terminal apparatus.

12. The authentication coordination method according to claim 11, wherein the first terminal apparatus control unit of the first terminal apparatus performs the steps of:

requesting an authentication of the second terminal apparatus or a user thereof to the second terminal apparatus, if the second terminal apparatus requests a transfer of the authenticated information; and conducting the authentication of the second terminal apparatus or the user thereof, based on the authentication information received from the second terminal apparatus for proving the second terminal apparatus or the user thereof to be authentic, and, if the authentication of the second terminal apparatus or the user thereof has been successfully completed, transmitting the authenticated information to the second terminal apparatus.

13. The authentication coordination method according to claim 12, wherein the first terminal apparatus and the second terminal apparatus are communicably coupled to a tamper resistant storage medium, wherein the storage medium stores therein secret information which is kept secret from the outside and the authenticated information, and wherein the storage medium control unit of the storage medium performs the steps of:

if the storage medium is coupled to the first terminal apparatus, generating authentication information for proving the storage medium or the user thereof to be authentic using the secret information, if the first terminal apparatus requests an authentication of the storage medium or a user thereof; and transmitting the authentication information to the first terminal apparatus, and receiving, if the authentication of the storage medium or the user thereof has been successfully completed at the first terminal apparatus, the authenticated information from the first terminal apparatus; and if the storage medium is coupled to the second terminal apparatus, requesting an authentication of the second terminal apparatus or the user thereof if the second terminal apparatus requests a transfer of the authenticated information; and conducting the authentication of the second terminal apparatus or the user thereof, based on authentication information received from the second terminal apparatus for proving the second terminal apparatus or the user thereof to be authentic, and transmitting, if the authentication of the storage medium or the user thereof has been successfully completed, the authenticated information to the second terminal apparatus.

14. The authentication coordination system according to claim 1, wherein, when a service request is received from the second terminal apparatus within a predetermined time period, the service is provided to the second terminal apparatus by the server apparatus without requiring the authentication processing therebetween.

15. The terminal apparatus according to claim 8, wherein, when a service request is received from the another terminal apparatus as the switching destination within a predetermined time period, the service is provided to the another terminal apparatus as the switching destination by the server apparatus without requiring the authentication processing therebetween.

16. The authentication coordination method according to claim 11, wherein, when a service request is received from the second terminal apparatus within a predetermined time period, the service is provided to the second terminal apparatus by the server apparatus without requiring the authentication processing therebetween.

\* \* \* \* \*